US012783978B2

(12) United States Patent
Eldar et al.

(10) Patent No.: US 12,783,978 B2
(45) Date of Patent: Nov. 3, 2026

(54) PLATFORM FOR MULTI-AGENT TASK PLANNING OF AUTONOMOUS SYSTEMS

(71) Applicant: Rafael Advanced Defense Systems Ltd., Haifa (IL)

(72) Inventors: Lior Eldar, Kibbutz Yifat (IL); Dan Greenstein, Zikhron Ya'akov (IL); Eyal Keren, Nofit (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 40 days.

(21) Appl. No.: 18/577,664

(22) PCT Filed: Jul. 4, 2022

(86) PCT No.: PCT/IL2022/050715

§ 371 (c)(1),
(2) Date: Jan. 8, 2024

(87) PCT Pub. No.: WO2023/286046

PCT Pub. Date: Jan. 19, 2023

(65) Prior Publication Data

US 2024/0281736 A1 Aug. 22, 2024

(30) Foreign Application Priority Data

Jul. 15, 2021 (IL) .......................................... 284896

(51) Int. Cl.
*G06Q 10/0631* (2023.01)

(52) U.S. Cl.
CPC .............................. *G06Q 10/06313* (2013.01)

(58) Field of Classification Search
None
See application file for complete search history.

(56) References Cited

U.S. PATENT DOCUMENTS 6,122,572 A 9/2000 Yavnai
7,895,071 B2 * 2/2011 Khosla .................. G06F 9/4881 705/7.12

(Continued)

FOREIGN PATENT DOCUMENTS

WO WO-2014190149 A1 * 11/2014 ........... G06F 9/4887
WO WO-2020180480 A1 * 9/2020 ............ G06N 3/045

OTHER PUBLICATIONS

RoldÃn, Juan JesÃºs, Jaime Del Cerro, and Antonio Barrientos. "Should we compete or should we cooperate? applying game theory to task allocation in drone swarms." 2018 IEEE/RSJ International Conference on Intelligent Robots and Systems (IROS). IEEE, 2018. (Year: 2018).*

(Continued)

*Primary Examiner* — Sara Grace Brown
*Assistant Examiner* — Derick J Holzmacher
(74) *Attorney, Agent, or Firm* — The Roy Gross Law Firm, LLC; Roy D. Gross

(57) ABSTRACT

A system for multi-agent mission planning comprises a) a mission generator (MG) configured to compute a set of Mission Agent Language (MAL) missions; b) a group of agents (TGPs), each capable of performing at least one MAL mission; and c) at least one Multi-Agent Planner (MAP) adapted to receive said set of MAL missions from said MG to build an allocation vector between said MAL missions and said agents in said group;

wherein each agent (TGP) is further capable of performing its assigned MAL mission per said allocation vector, while considering all other agents in its corresponding tactical group.

11 Claims, 8 Drawing Sheets

(56) References Cited

U.S. PATENT DOCUMENTS

| | | | | |
|---|---|---|---|---|
| 9,436,187 | B2 * | 9/2016 | Arbogast | G01C 21/20 |
| 10,203,701 | B2 * | 2/2019 | Kurdi | G05D 1/0027 |
| 10,281,281 | B2 * | 5/2019 | Ward | G01C 21/203 |
| 10,496,095 | B1 * | 12/2019 | Bays | G05D 1/60 |
| 11,269,683 | B1 * | 3/2022 | Kutzke | G06F 9/4806 |
| 12,061,673 | B1 * | 8/2024 | Soleyman | G06F 18/2185 |
| 2010/0163621 | A1 * | 7/2010 | Ben-Asher | G05D 1/104 235/412 |
| 2014/0351819 | A1 * | 11/2014 | Shah | G06F 9/4881 718/103 |
| 2017/0366443 | A1 * | 12/2017 | Fouad | H04L 43/10 |
| 2019/0087529 | A1 * | 3/2019 | Steingrimsson | G06F 16/2465 |
| 2019/0235488 | A1 | 8/2019 | Beth et al. | |
| 2019/0339691 | A1 * | 11/2019 | Scrapper | G05D 1/0027 |
| 2020/0134491 | A1 * | 4/2020 | Cruise | G06N 20/00 |
| 2020/0334593 | A1 | 10/2020 | Saad et al. | |
| 2020/0410399 | A1 * | 12/2020 | Lang | G06N 3/006 |
| 2021/0325891 | A1 * | 10/2021 | Young | B60W 60/0027 |
| 2022/0027798 | A1 * | 1/2022 | Liebman | G05D 1/46 |
| 2023/0179512 | A1 * | 6/2023 | Drusinsky | H04L 45/24 709/238 |

OTHER PUBLICATIONS

Pantelimon, G., et al. "Survey of multi-agent communication strategies for information exchange and mission control of drone deployments." Journal of Intelligent & Robotic Systems 95 (2019): 779-788. (Year: 2019).*

Zhang, K. et al., "Synthesis Constraints Optimized Genetic Algorithm for Autonomous Task Planning and Allocating in MAS"; 2009 Seventh ACIS International Conference on Software Engineering Research, Management and Applications; IEEE; Retrieved from the Internet:<URL:https://, Dec 4, 2009, pp. 10-15.

Anari, N. et al., "Nash Social Welfare, Matrix Permanent, and Stable Polynomials" arXiv preprint arXiv: 1609.07056 (2016) ; Retrieved from the Internet :<URL: https://arxiv, Sep. 23, 2016, 13 pages.

PCT International Search Report and Written Opinion, PCT Application No. PCT/IL2022/050715, Oct. 6, 2022, 8 pages.

* cited by examiner

PLATFORM FOR MULTI-AGENT TASK PLANNING OF AUTONOMOUS SYSTEMS

A system for multi-agent mission planning includes a Mission Generator (MG) configured to compute a set of Mission Agent Language (MAL) missions; a group of agents (TGPs), each capable of performing at least one MAL mission; and at least one Multi-Agent Planner (MAP) adapted to receive the set of MAL missions from said MG to build an allocation vector between the MAL missions and the agents in the group. The architecture supports dynamic coordination, scalability, and adaptability by allowing mission allocation based on correlation order, enabling both centralized and distributed control modes, and facilitating executing of complex, cooperative missions in real time.

FIELD OF THE INVENTION

The present invention relates to the field of autonomous systems. More particularly, the invention relates to a computerized platform for multi-agent task planning of autonomous systems.

BACKGROUND OF THE INVENTION

In recent years, it has become apparent that any architecture for large-scale deployment of autonomous decision systems must support both scalability of deployment, as well as flexibility in their ability to coordinate their actions and to operate with varying architecture (from fully centralized to fully distributed). Also, such coordination usually entails complicated, communication-intensive mechanisms for inter-agent coordination, and requires very stringent computational assumptions, in order to execute the heavy numerical computations involved in task allocation and coordination.

In many real-world scenarios, collaboration and coordination between agents are only crucial locally: physical "causality" usually restricts the radius effect of any agent to the local environment of its location, and the advantage of coordinating with far-away agents decreases with the distance. Furthermore, on very large scales, it is conceivable that perfect coordination may not be necessary; if "most" agents are "roughly" coordinated, the result may be sufficient, especially if the pending task can be performed with some margin of error or uncertainty.

In mathematical terms, given any world state S, one can define a low-degree polynomial p(S), the coefficients of which encode the utility or advantage of correlating between small groups of agents which are O(1)—i.e. constant in the size of the entire swarm. The degree of such a polynomial corresponds to the largest "small" group of agents that should coordinate their actions in detail. When the agents at hand are deployed for military purposes, the "combat effectiveness" of the complete system of agents is determined by finding an assignment of agents to missions that maximizes the overall value of this low-degree polynomial, or is at least sufficiently close to it.

It is understood by a skilled person that the solution of such systems and different scenarios could lead to high computation complexity. Together with the statement that in some scenarios a "good enough" result is sufficient, different ways of complexity relaxation could be provided—for example, demanding less computational resources, or meeting strict real-time requirements. In other words, it is clear to a skilled person that providing an exact solution for such a set of equations is intractable (NP-complete problem), hence it is assumed that in typical scenarios a "good enough" (or, mathematically, a constant fraction approximation of the objective function) can be efficiently computed using reasonable on-platform computational resources, in order to meet strict real-time requirements.

Some existing autonomous systems use autonomous agents to plan the execution of autonomous missions. However, these autonomous systems generate a specific mission plan for all agents but fail to provide a solution to the problem of dynamic and efficient coordination between agents. Consequently, these autonomous systems cannot obtain maximal coordination between agents and quickly responds to variations in real-world states, while optimally selecting agents and assigning tasks for each mission to be accomplished.

It is an object of the present invention to provide a system for multi-agent optimal task planning with high flexibility.

It is another object of the present invention to provide a system for multi-agent optimal task planning with high computational scalability.

It is a further object of the present invention to provide a system for multi-agent optimal task planning, which is adaptive to changes.

Other objects and advantages of the invention will become apparent as the description proceeds.

SUMMARY OF THE INVENTION

The invention relates to a system for multi-agent mission planning, comprising:

a) a mission generator (MG) configured to compute a set of Mission Agent Language (MAL) missions;

b) a group of agents (TGPs), each capable of performing at least one MAL mission; and c) at least one Multi-Agent Planner (MAP) adapted to receive said set of MAL missions from said MG to build an allocation vector between said MAL missions and said agents in said group;

wherein each agent (TGP) is further capable of performing its assigned MAL mission per said allocation vector, while considering all other agents in its corresponding tactical groups.

In some embodiments the multi-agent mission system further comprises a GroupDetector (GD) capable of identifying for each mission its set of allocated agents, based on said allocation vector, wherein said set of agents is configured to perform a MAL mission according to said GD identification.

According to an embodiment of the invention there is provided a multi-agent mission system in which:

a) each agent is further configured to receive multiple missions (MAL); and b) each agent further comprises a Selector capable of selecting a MAL mission to be performed from all received MAL missions.

Each agent and/or Tactical Group Planner (TGP) may, according to embodiments of the invention, be capable of translating the agent assigned mission into high-resolution actuating commands, to be performed by a set of corresponding actuators.

In some embodiments the allocation of each vector is selected by computing the highest value of a k-degree polynomial that encodes a solution of all possible mappings of tactical groups to missions, said polynomial representing the effectiveness of said each allocation.

According to embodiments of the invention the size of each tactical group is at most the correlation order of the system. According to other embodiments the MG computes the MAL missions based on world-state input, and said world-state being a collection of data that corresponds to targets and agents. The MAL may be, in some embodiments, an abstract language defining a set of single-agent missions.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF EMBODIMENTS OF THE INVENTION

Figure 1:
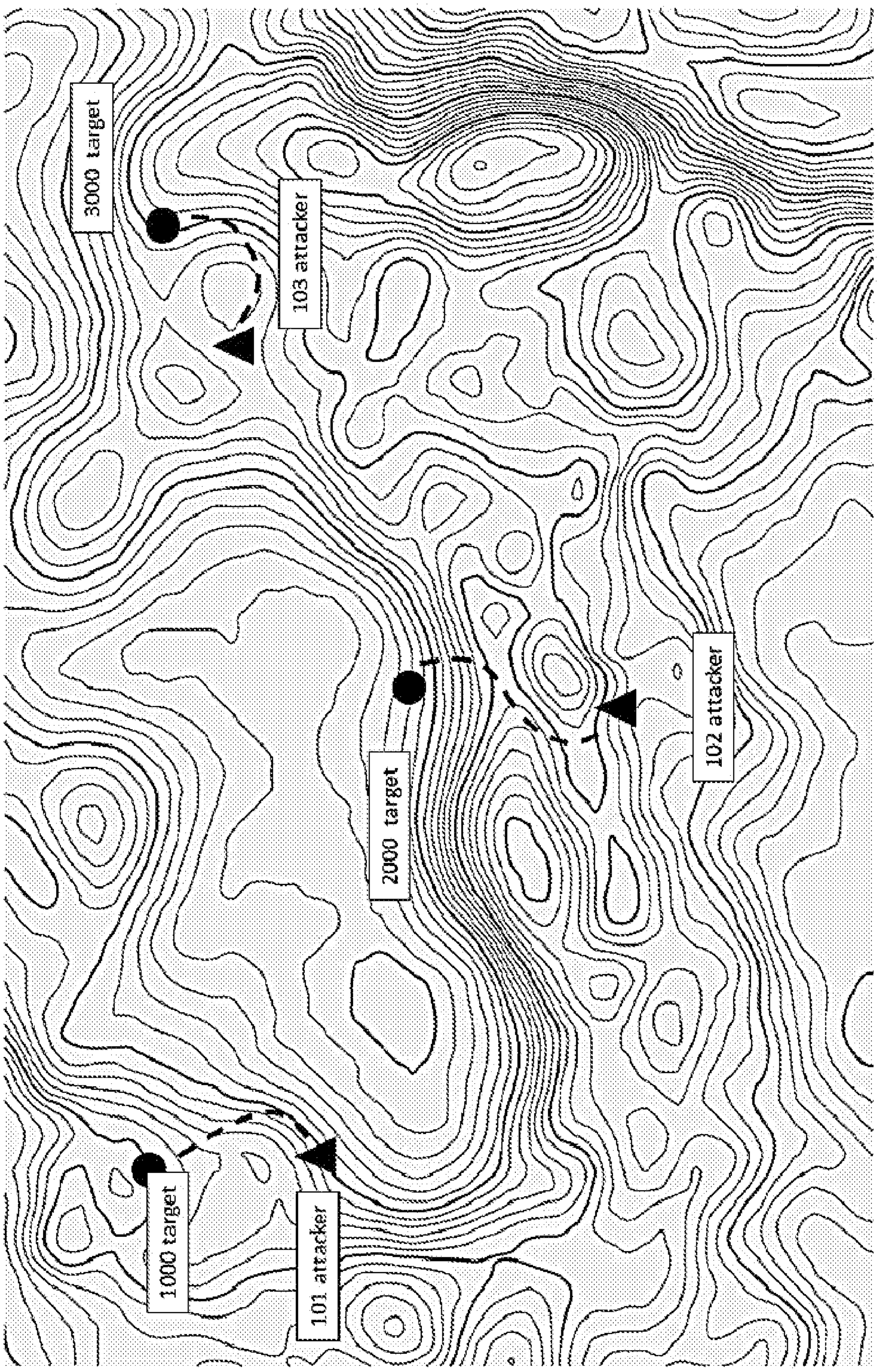
FIG. 1 shows an example of an uncorrelated attack or using a standard task allocation scheme.

The present invention provides a computerized platform for multi-agent task planning of autonomous systems. The invention is not limited to any specific type of agent and an agent can be, for example, a drone, a weapon, an armoured vehicle, a robot with a camera, etc., which can perform different tasks, such as shooting, photographing, listening to radio communication, searching for explosive charges, etc. In the context of this description the terms "agent," "robotic agent," robot, and the like, should be understood to be interchangeable.

Planning an autonomous multi-agent operational task is a difficult and complex computational problem in terms of validity, user understanding, and scalability, and challenging to implement, especially in heterogeneous swarms in terms of their computational capability.

In order to alleviate the above difficulties and overcome some of them, the present invention provides an architecture for managing a heterogeneous group of robotic agents, based on the separation between multi-agent abstract surface design (using a dedicated multi-agent language), hereinafter defined as "multi-agent planner", and detailed tactical design for execution. Each individual agent, hereinafter referred to as the "Tactical Planner", is independent of all other agents.

Definitions

1. Tactical Group—a group of agents that engage together in a well-defined combat mission.
2. Tactical Group Planner (TGP)—or agent—a function that is able to compute a high-resolution combat simulation for all agents in the tactical group.
3. Multi-Agent Language (MAL)—a set of combat primitives, denoted by Σ.
4. Correlation order (k) the largest size of a tactical group considered by the system per mission.
5. Multi-agent language word: represents a distinct tactical operational action.
6. Multi-language sentence: a collection (a vector) of words that represents the actions of all the agents in the system (from the point of view of the allocation operation). For example: photography, shooting, listening to communication, etc. If there are m possible words, and n possible agents, there are m^n possible sentences.
7. Selector: an algorithm that given an arbitrary number of sentences (n-dimensional assignment vectors) decides what is the best word for the current agent. For example—a majority vote.
8. Group Detector: an algorithm that given a single sentence, decides which agents should collaborate in performing the task allocated to the current agent in that sentence. This entails computing the combat correlations between the tasks of all agents.

The present invention provides a method for coordinating between agents hereinafter referred to as "Multi-Agent Language" (or MAL). The MAL is a set of combat primitive missions {ScanArea, TrackTarget, etc.} including missions that require small-scale coordination {multi-sensor tracking, relay transmission, etc.}. The MAL is then used as the defining mechanism of a multi-agent autonomous system that performs the following actions:

1. Each agent (a Mission Generator) computes a "pool" of MAL missions according to its world state S: $\{b_1, \ldots, b_m\}$, where m represents the number of tasks to be performed.
2. Each agent (MAP) then applies an integer programming solver to a low-degree polynomial whose coefficient for each monomial $x\_\{a_1,b_1\}, \ldots, x\_\{a_k,b_k\}^1$ is the expected utility (where the expectation is taken over the assumed probability distributions on the world state) to the entire squad in agent $a_1$ performing task $b_1$, up to agent $a_k$ performing task $b_k$ (The vector (1 . . . k) represents the selection of all possible sub-groups in k-size out of (1 . . . n)). The optimization of the polynomial results is a global assignment vector—where each agent receives a single MAL mission.
3. Each agent then performs the MAL mission that it "assigned" to itself, based on the assignment vector, while optionally coordinating its actions with other agents via consensus mechanisms. The execution of the MAL mission entails a high-resolution simulation of the battle on small scales. This is performed by a component denoted as the Tactical Group Planner.

A basic element of the proposed platform is an abstract multi-agent language for describing atomic tasks for individual agents, for example:

a) RT-17—ReconTarget: reconnaissance mission that seeks to obtain the best possible information on entity number 17—for example, ascertain its location and its type (classification).
b) RP—Refueling task: Given the world-state consisting of known entities, mapping material, etc.—return to the nearest logistic center for refueling while attempting maximize survivability of the entity.
c) ComplexTasks: (RR=ReconRegion, RRC=ReconRegionCover)—these are tasks the detailed plan for which must be correlated with the details of another task: for example the task of providing cover for an agent performing regional reconnaissance is planned jointly with the task of that agent so as to coordinate their actions in the fields as precisely as possible, both spatially and temporally.

The multi-agent language is based on the understanding that a multifunctional combat situation can be described by a collection of tactical operational atoms (mission defined for a single vessel), with weak/local coupling (for example, the mutual influence of a mission defined on other missions of other vessels). The language allows crossing the solution to the problem of optimizing the entire battle into 2 main components:

a) Top-level strategic planning (a "chess-player")—performs optimization at an abstract level in relation to a language, while taking into account correlations between tactical tasks.

b) Tactical planning—detailed words in a language for concrete actions in the battle in terms of firing/observation/movement and photography.

The advantages of the separation into top-level strategic planning and tactical planning are:

Algorithmic targeting: Separation between planning against an unmodeled maneuvering enemy (that cannot be efficiently modeled as a Markov Decision Process) that is difficult to characterize or to model, which has no clear characteristics or a specific template that can be defined, something more random that is difficult to find in its actions clear characteristics, legality or patterns) and solving more concrete and easy optimization problems (graph search, learning, etc.) some of which have a dedicated and efficient algorithmic solution.

Greater computational scalability: The complication increases according to the number of design entities in the swarm, and not according to the number of actuators. In this context, an actuator is a component or a factor that operates systems, components or subsystems like: sensing, firing, motion, etc. The present invention uses computational selectivity, in order to obtain a sufficient level of accuracy upon reaching a predetermined threshold of computational complexity. Computational selectivity is important particularly when many agents are involved and increase the total computational complexity. Therefore, in order to obtain sufficient results relatively fast (in some missions the timing and the time of reaction are critical), there is no need to fully complete the entire computation. Instead, upon exceeding the predetermined threshold, the approximated calculation is typically sufficient for extracting location, time, speed, shooting timing, picturing timing, etc., with reasonable accuracy.

Language flexibility: Operational richness can be expanded by adding new words to the language, without changing the rest of the system (Increasing the language, i.e. adding operational actions that did not exist before will not cause all the words/sentences in the system to have to be redefined).

Distribution flexibility: The interaction between the agents described above allows the platform to operate transparently, and without explicit knowledge of any control configuration (a control configuration means, in this context, how to initially program a device that allows a particular component/the device to start operating). If the world perception is the same in all the agents, the platform will function as a fully centralized system, where the calculation is performed "simultaneously" in all the agent (there is a central control and calculation system for all the agents). The advantage of a centralized system is that there is one body that is continuously updated with all the information about the status and tasks of each agent. As long as everything works properly, there are situations where this configuration has an advantage in terms of optimal operation. The central control and calculation system is updated at any given moment regarding the status of each of the agents. However, a centralized system has a disadvantage when there is a faulty component. For example, during lack of communication between a particular agent and the central control and calculation system, it is possible to get into a state of lack of control, malfunctioning, neutralization of agents, or wrong actions of agents. Since there is great dependence of agents in the control of the centralized system, these agents strongly depend on the central system and in order to function properly, should constantly receive instructions/orders from it all the time. Each agent has a communication system. The communication between agents and other agents or the multi-agent mission planners may include radio, satellite, internet, and other wireless protocols.

The control unit is adapted to receive input from all agents separately and together, and there is an algorithmic system that performs a situation assessment and builds an optimal action plan according to the situation in the field.

There may also be a human operator who can intervene in the decisions of the system and how it operates at its discretion and may also have additional data that it takes into account (strategic considerations, some limitations, additional data that do not exist in the system, etc.).

Distributed management: On the other hand, if the world perception is different between the agents, (for example in a state of lack of communication) then the system will function as a distributed system (where each agent has a certain independent work ability and it does not have to receive orders from central control and calculation system or report about actions). In case of no communication, the agent enters into an autonomous mode of decision making. For example, an autonomous mode may be activated using sensors, history of similar actions done, etc. without the need to receive an outside indication of a change of working point (i.e., about the transition from centralized system management to more distributed/partially distributed management, in case of communication fault with only some of the agents, for example). Thus, the system is designed to adapt itself to the current work point in any combat situation (i.e., the system is configured to work in a mode of distributed or partially distributed management and not only in a state of centralized management), and complete tasks as close as possible to optimal results. This applies even in new situations in which, for example, contact with some of the agents is lost, and the system can work close to the optimum state even when the system controls only some of the agents with which there is still communication, while the other part of the agents with which the communication is lost move to work independently.

The transition between centralized and distributed management is dynamic, due to different situations of communication loss and recurrence of communication, or temporary downtime of certain agents, since some agents have the ability of self-stabilization and recovery from failure upon resuming communication. Hence, the system knows how to adjust itself constantly to situations that change dynamically. A swarm of agents can include agents which are defined as masters over other agents, in order to dynamically control the optimal group of agents for performing a mission and the number of agents in the group, which may vary according to the mission execution complexity. For example, in some situations, there is a need for more agents to join the swarm for backup, or if there is no need for all agents, some of them can be removed from the mission. Such a dynamic control allows assigning agents to other tasks or adding more agents to a task. It is also possible to build a new hierarchy of agents during an action. In addition, the invention allows dynamically changing the assigned task, according to changing conditions. For example, an agent with the task of a tracker that is looking for explosive devices receives a new mission of taking photos or be a communication/control agent.

Examples of Centralized or Partially Distributed Systems:

1. Best-effort centralized: multi-agent designers that are not coordinated but share an essentially similar world perception (i.e., they have shared/similar partial characteristics without coordination between them).
2. Centralized: absolute centralized management: using a consensus component to coordinate all the agents *single sentence* in the multi-agent language agreed upon by all agents.
3. Locally distributed: deploy a tactical planner (e.g., a software component) in all agents, and a multi-agent ability to coordinate with other agents only in some of them. This is done by adding to each of these agents a selector component that listens to multi-agent sentences for a collection of tasks to be performed, received from the multi-agent planner, and independently selects from them a sentence representing a collection of tactical tasks for execution.

XAI: When trying to understand the swarm's decisions, it is easier to observe "sentences" in the multi-instrument language that each instrument produces, to understand the intent of the system, rather than observe the tactical planner output that activates the sensing/motion/fire operations. By doing so, the architecture actually opens a "window" for decision-making by the top planner (strategic planning) that is easier to understand by a human operator. The sentences from descriptive combinations arise between several agents with coordination between them.

Computational heterogeneity: In a situation where some of the agents are unable to withstand the computational load of the heavier multi-agent planner, only a tactical planner can be installed on them, for receiving instructions from a neighboring multi-agent planner on an agent with appropriate computing capabilities. In this way, it is possible to adapt for a heterogeneous band in terms of its computational capability, optimal hardware architecture, i.e., it is possible to decide what power of the computational capabilities to put on each agent, and thus weaker agents with lower computational capabilities can benefit from the computational capabilities of other more powerful hardware, which have higher computational capabilities.

Asynchronous Services

The architecture of the platform according to one embodiment of the invention includes several asynchronous services:

a. The Multi-Agent:
   i. calculates for itself and for the other agents "sentence" in the multi-agent language that describes the task that each agent should perform "in its opinion."
   ii. distributes the "sentence" throughout the other agents of the system.

b. The Tactical Planner:
   i. builds from the variety of sentences in the multi-agent language, for which it "extracts" the intended task to be executed. In other words, the computer of a particular agent listens to a general sentence generated by the multi-agent planner and corresponds to a strategic task, which describes the achievement of a particular goal. The tactical planner deduces from that general sentence which tactical mission/task to perform.
   ii. explains in detail the intended atomic mission according to its understanding.

c. Group Detector:
   i. Given a sentence in the multi-agent language, the GroupDetector generates an assignment to the combat subgroup relevant to the general multi-agent platform. The GroupDetector determines which combat subgroups will be selected and what will their missions be. Generally, there is a hierarchy between tasks. For example, the Group Detector determines which agents will be included in each combat subgroup and which tasks each subgroup is supposed to perform. Then, each agent within a subgroup will be dedicated to a tactical task to be performed.

d. Selector:
   i. Given a collection of sentences in the multi-agent language, the selector produces an assignment of tasks to the relevant combat subgroup in the platform.

FIG. 1 shows an example of an uncorrelated attack using a standard task allocation scheme as a result of agent-mission matching. In this example, the targets 1000-3000 are located at strategic points on a given topographic mountainous terrain. The mission of attackers 101-103 is to attack targets 1000-3000, respectively. According to this scheme, each agent attacks a nearby assigned target, with only a relatively small probability of success, since attackers 100-103 are not correlated.

Figure 2:
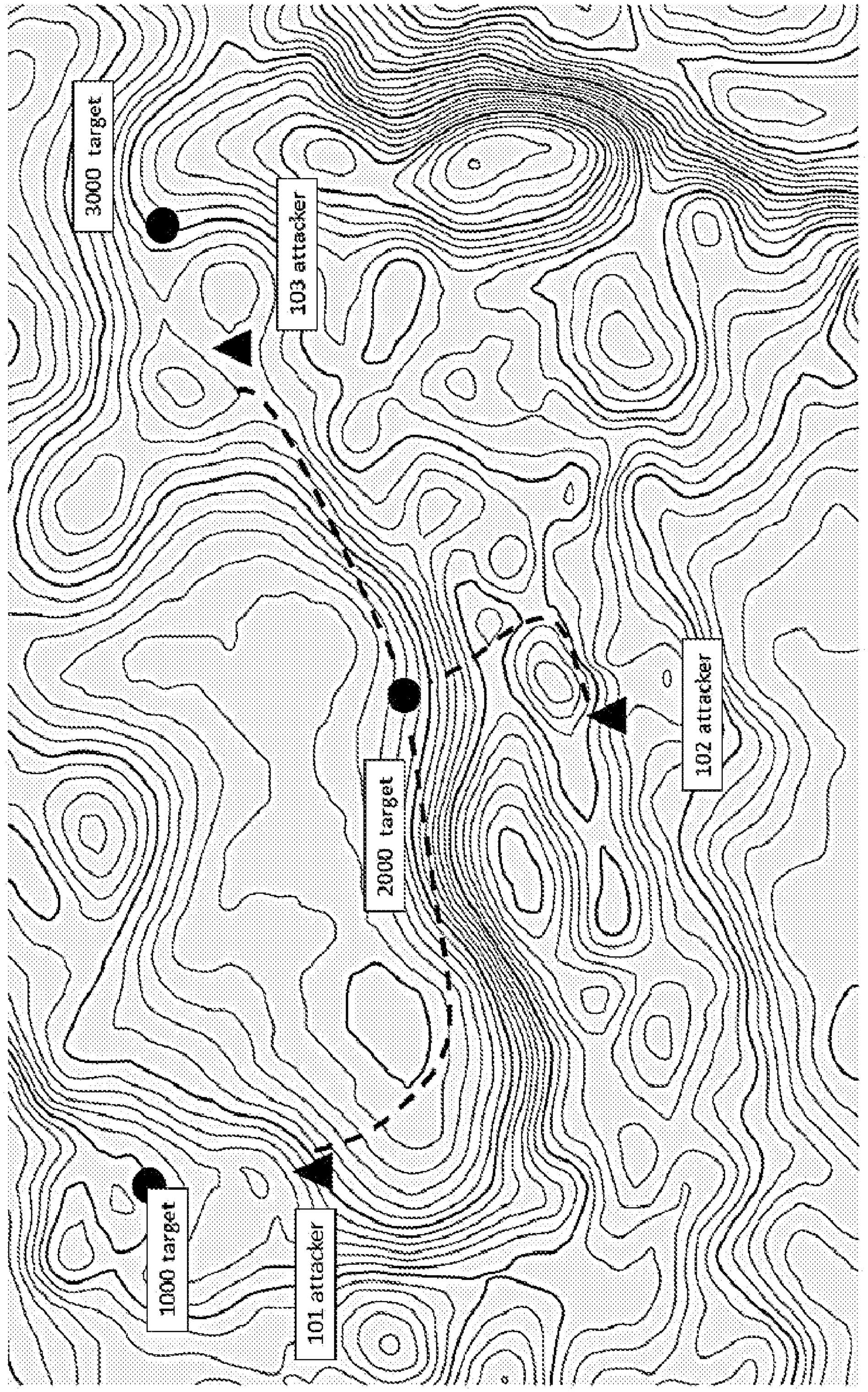
FIG. 2 shows an example of a correlated attack.

FIG. 2 shows an example of a correlated attack. In this example, the targets 1000-3000 are located at the same strategic points on a given topographic mountainous terrain. The mission of attackers 101-103 is to attack targets 1000-3000, respectively. Here, correlation is exploited to generate geometric synergy between attackers 1000-3000, so as to maximize the probability of success. Local correlations between agents can be taken for a large set of agents at a modest computational cost.

Figure 3:
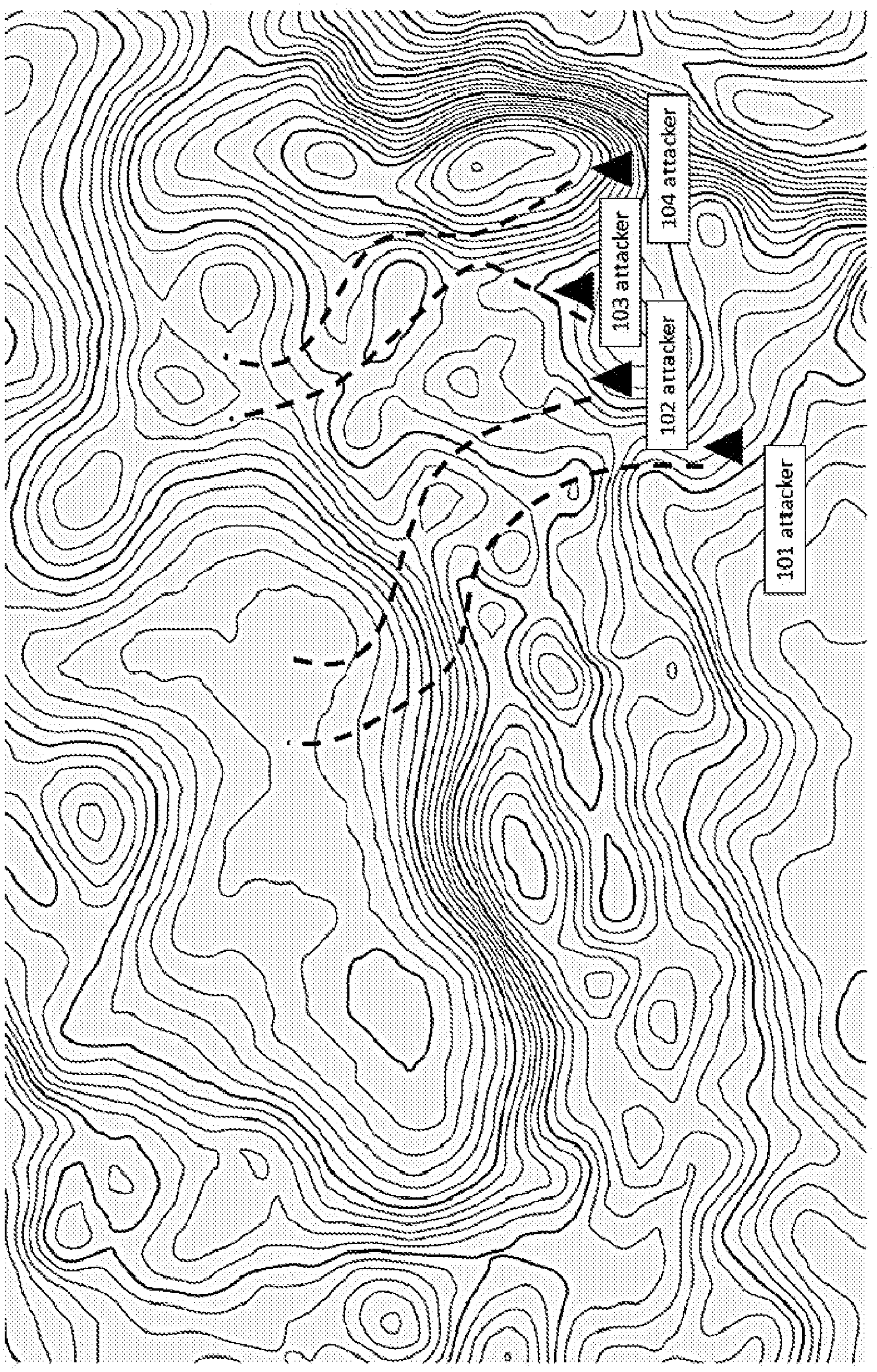
FIG. 3 shows an example of dynamic partition of a group of agents into small task forces, according to an embodiment of the invention.

FIG. 3 shows an example of a dynamic partition of a group of agents into small task forces, according to an embodiment of the invention. In this example, attackers 101-104 are partitioned into two pairs, where attackers 101-102 constitute a first pair and attackers 101-102 constitute a second pair. Attackers 101-102 move toward their target in a first coordinated path and attackers 103-104 move toward their target in a second coordinated path, so as to pairwise optimize their sensing probability or efficiency while performing the task.

Figure 4:
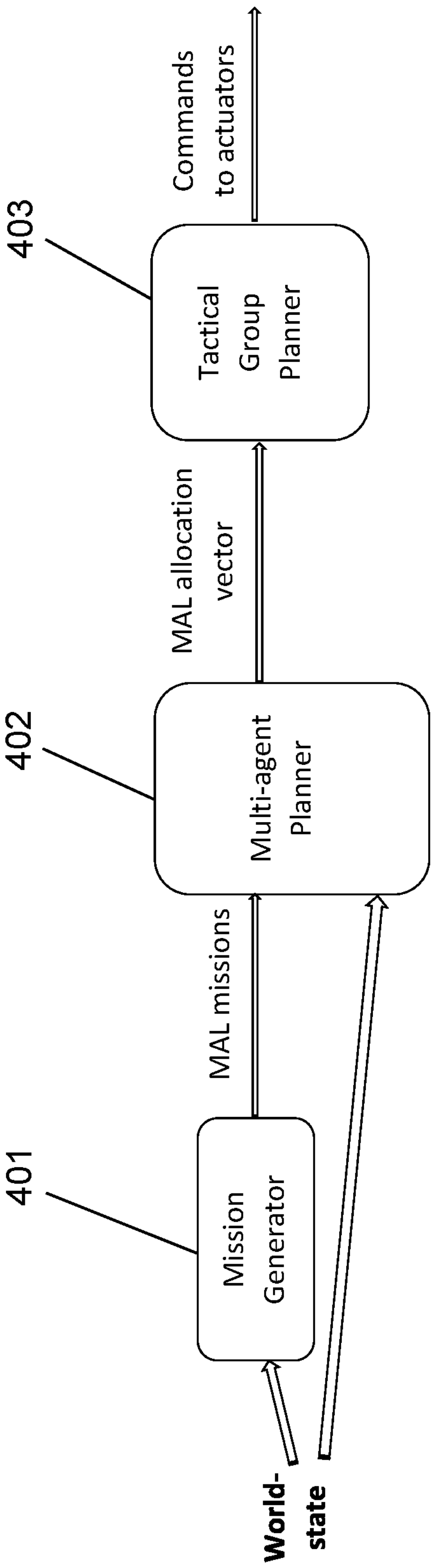
FIG. 4 shows a schematic description of the data-flow in an MAL-based scheme, according to an embodiment of the invention.

FIG. 4 is a schematic description of the data-flow in a MAL-based scheme, according to an embodiment of the invention. The world-state is sent to the mission generator 401, which computes a set of relevant MAL missions. Then the multi-agent planner 402 computes a k-degree polynomial, based on world-state and the set of MAL missions, where k is kept to be sufficiently low on one hand to allow efficient computation, and sufficiently large, to capture the richness of the combat scenario.

The multi-agent planner 402 maximizes the best assignment of the following polynomial:

$$\sum_{\{(i_1,j_1),\ldots,(i_k,j_k)\}} u_{\{(i_1,j_1),\ldots,(i_k,j_k)\}} x_{\{i_1,j_1\}} \cdot x_{\{i_2,j_2\}} \cdot \ldots \cdot x_{\{i_k,j_k\}}$$

It is also possible to write the function of the MAL planner as the following optimization pseudo-code:

n=number of agent, m=number of missions, k—poly order, max_u=0

#enumerate over all possible allocations of m missions to n agents

This is basically a naïve operation—it assumes single-agent missions, as if all allocations are valid.

1. For all nextAlloc in [m]^n (i.e. n-dimensional cube of side-length m)
2. Func_value(nextAlloc)=0
3. #enumerate over all tuples of low order calculating all k-level "cooperations" utilities:
   a. For all subset S of size k out of n (n choose k)
   b. Func_value(nextAlloc)=func_value(nextAlloc)+ Synergy(S, v) #synergy(S,nextAlloc)—the value of agent subgroup S simultaneously being allocated to their missions according to nextAlloc.
4. #keep the allocation with highest utilization: If func_value>max_u
   a. max_u=func_value
   b. best_allocation=nexAlloc The multi-agent planner 402 then solves the polynomial to find a MAL allocation vector, and the Tactical Group Planner 403 computes a high-resolution set of commands to the actuators for a specific mission corresponding to its own ID, while considering all agents that are involved (in the tactical level) with its MAL mission. All agents that are involved are a sub-set of agents, capable of performing a MAL mission, which therefore share the same ID, which form a Tactical Group. As will be apparent top the skilled person, each agent may have different capabilities, or two or more agents may have the same capabilities, and such agents coordinate how to accomplishing the mission.

Deployment at Large Scales

When deploying an MAL multi-agent system, the deployment is comprised of a set of multi-agent planners, and tactical planners, which listen to the commands of these multi-agent planners. Both these planner types can be executed as asynchronous processes. The coordination between the MAL agents can be carried out in several levels:

1. Implicitly, via the world-state. In this case, by programming the coefficients of the polynomial to be stable against small deviations in world-state, one can ensure that the MAL allocation vectors are "typically" in consensus, at least for most entries.
2. Explicitly, by communicating MAL allocation vectors between agents, and trying to generate some form of consensus on the assignment.

When deploying the MAL system on a set of multi-agents with varying computational capabilities, it is possible to deploy the system differentially. The multi-agent planning service (MAP) is computationally much more intensive than the tactical planner, since its complexity grows at least linearly with the number of agents. Hence, the deployment of MAP/TGP to agents services should be configured to match the computational capabilities of these agents. In particular 1. In high-power agents: deploy a MAP and a TGP
2. In low-power agents: deploy TGP only.
3. In a command and control center: one may choose to deploy a MAP agent only in order to be able to witness the allocation decisions of the system.

Figure 5:
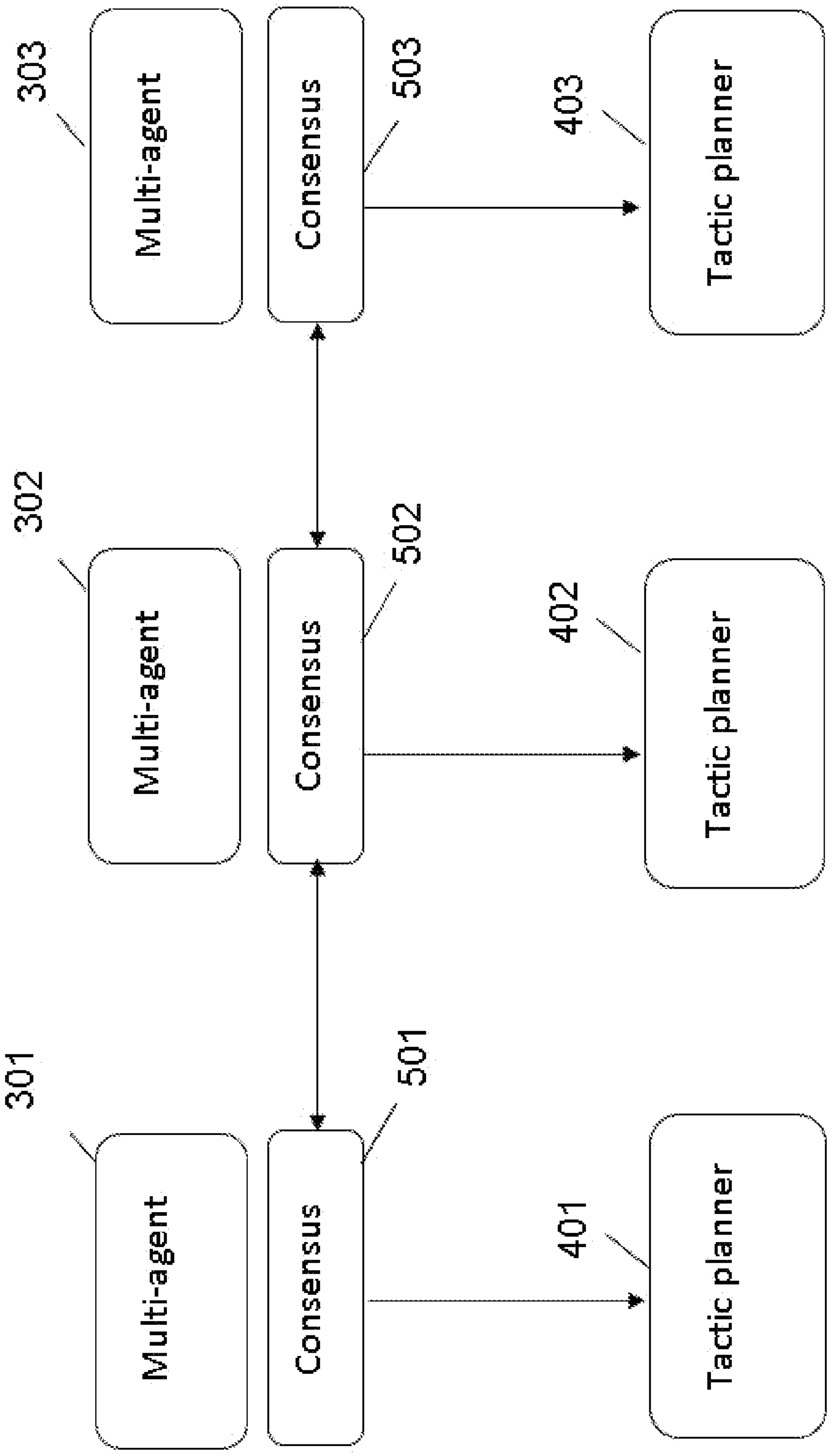
FIG. 5 shows an example of a centralized configuration, according to an embodiment of the invention.

FIG. 5 shows an example of an explicit-consensus configuration, according to an embodiment of the invention. In this example, coordination between the multi-agent components 301-303 is performed by consensus modules 501-503 before execution by the tactical group planners 401-403.

Figure 6:
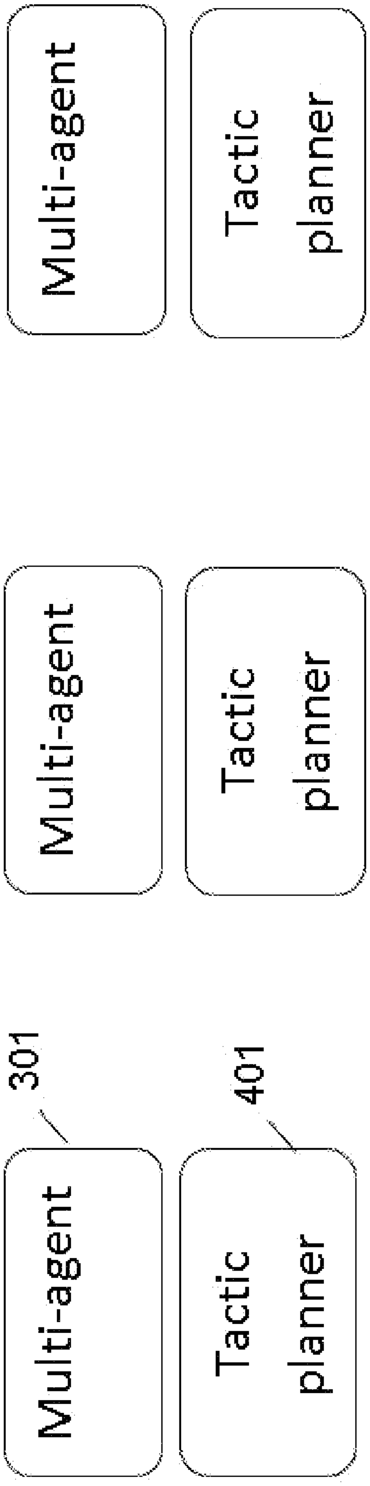
FIG. 6 shows an example of best-effort centralized configuration, according to an embodiment of the invention.

FIG. 6 shows an example of state-space coordination configuration, according to an embodiment of the invention. In this example, each tactical planner 401 operates in relation to a pre-determined multi-agent planner 301. There is no explicit action-side coordination between the multi-agent planners and coordination between them is only implicit in the fact that they share a common world-state input.

Figure 7:
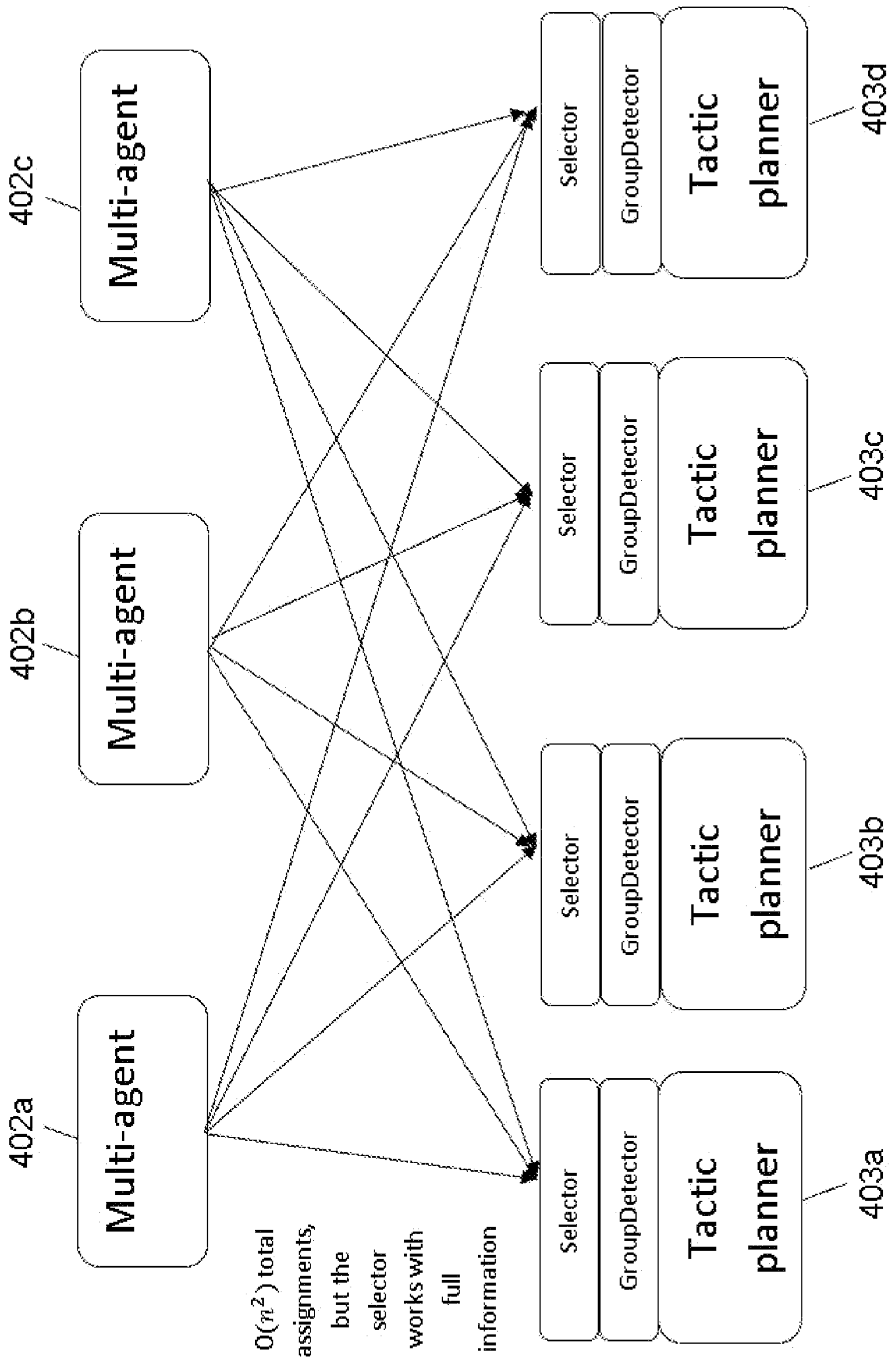
FIG. 7 shows an example of locally-distributed configuration, according to an embodiment of the invention.

FIG. 7 shows an example of Locally-distributed configuration, according to an embodiment of the invention. In this example, multi-agent planners 402*a*-402*c* do not share information among themselves but each tactical planner 403*a*-403*d* listens to each multi-agent and decides on a single sentence. A relevant combat group is then synthesized from this sentence.

Figure 8:
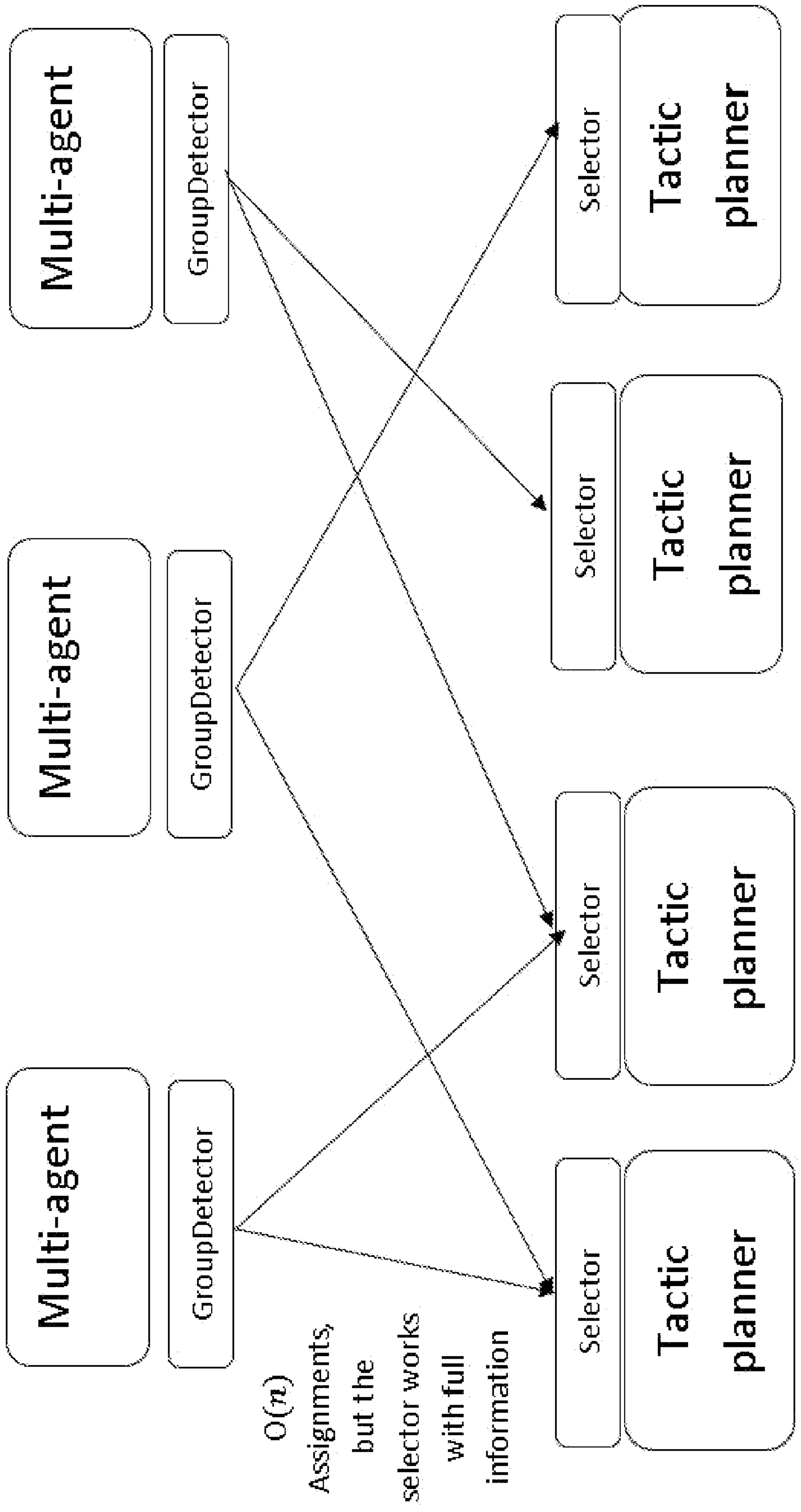
FIG. 8 shows an example of locally distributed/comm. efficient configuration according to an embodiment of the invention.

FIG. 8 shows an example of locally distributed/comm. efficient configuration according to an embodiment of the invention. In this example, the division into tactical groups is done at the multi-agent planner level—so each MAP sends to each agent only the subset of missions (part of a sentence) that are relevant to its allocation. Hence, less information needs to be sent between the agents. This comes at an increased computational load on the side of the tactical planner—the selector at the side of the TGP receives only subsets of words, one from each MAP, and needs to infer the full set of words that may be relevant to the mission it ultimately selects.

As various embodiments and examples have been described and illustrated, it should be understood that variations will be apparent to one skilled in the art without departing from the principles herein. Accordingly, the invention is not to be limited to the specific embodiments described and illustrated in the drawings.

The invention claimed is:

1. A system for executing a multi-agent mission, comprising:

a) a mission generator (MG), executed by one or more computer processors, configured to compute, based on world-state input, said world-state input being a collection of data that corresponds to targets and autonomous platforms, a set of Mission Agent Language (MAL) missions, wherein a Mission Agent Language (MAL) is an abstract language defining a set of single-agent combat primitives;

b) a plurality of n autonomous platforms, each autonomous platform comprising one or more actuators and one or more computer processors executing a Tactical Group Planner (TGP) configured to translate a MAL mission mapped to a respective autonomous platform into actuator-level commands for controlling said one or more actuators; and c) at least one Multi-Agent Planner (MAP), executed by one or more computer processors, configured to receive said set of MAL missions and said world-state input, compute a k-degree polynomial based on said world-state input and the set of MAL missions, and generate an allocation vector mapping said set of MAL missions to said plurality of n autonomous platforms by maximizing said k-degree polynomial or computing an allocation that provides a constant-fraction approximation of a maximum value of said k-degree polynomial;

wherein k is a correlation order corresponding to a maximum number of autonomous platforms in a tactical group considered by the at least one MAP per MAL mission, and k<n; and wherein each Tactical Group Planner (TGP) is further configured to compute, for the respective autonomous platform, actuator-level commands for performing the MAL mission mapped to the respective autonomous platform, based on the allocation vector and on MAL mission assignment information for one or more other autonomous platforms that are part of a common tactical group for said MAL mission.

2. The system for executing the multi-agent mission according to claim 1, further comprising:

a GroupDetector (GD) configured to identify, for each MAL mission, a set of allocated autonomous platforms based on said allocation vector;

wherein the Tactical Group Planner (TGP) of each autonomous platform of said set of allocated autonomous platforms is configured to compute actuator-level commands according to said GD identification.

3. The system for executing the multi-agent mission according to claim 1, wherein:

each autonomous platform is further configured to receive multiple MAL missions or portions of multiple allocation vectors mapping MAL missions to autonomous platforms; and each autonomous platform further comprises a Selector configured to select a MAL mission to be performed from said multiple MAL missions or portions of multiple allocation vectors mapping MAL missions to autonomous platforms.

4. The system for executing the multi-agent mission according to claim 1, wherein the at least one Multi-Agent Planner (MAP) and the Tactical Group Planner (TGP) of each autonomous platform are executed as asynchronous processes.

5. The system for executing the multi-agent mission according to claim 1, wherein coefficients of monomials of said k-degree polynomial represent expected utilities of corresponding combinations of autonomous-platform assignments to MAL missions for tactical groups of up to k autonomous platforms.

6. The system for executing the multi-agent mission according to claim 1, wherein said k-degree polynomial includes terms corresponding to tactical groups having no more than k autonomous platforms.

7. The system for executing the multi-agent mission according to claim 1, wherein said world-state input comprises data corresponding to locations or classifications of targets or autonomous platforms.

8. The system for executing the multi-agent mission according to claim 1, wherein said set of MAL missions comprises one or more of scanning an area, tracking a target, multi-sensor tracking, or relay transmission.

9. The system for executing the multi-agent mission according to claim 1, wherein a first autonomous platform of said plurality of n autonomous platforms executes both a Multi-Agent Planner (MAP) and a Tactical Group Planner (TGP), and a second autonomous platform of said plurality of n autonomous platforms executes a Tactical Group Planner (TGP) without executing a Multi-Agent Planner (MAP).

10. The system for executing the multi-agent mission according to claim 1, wherein the correlation order k remains constant as n varies.

11. The system for executing the multi-agent mission according to claim 1, wherein the autonomous platforms are configured to coordinate execution of the multi-agent mission by communicating said allocation vector or further allocation vectors between the autonomous platforms to generate consensus on assignments of MAL missions to autonomous platforms.

* * * * *